United States Patent
Hershey et al.

(10) Patent No.: US 12,323,330 B2
(45) Date of Patent: Jun. 3, 2025

(54) PACKET REROUTING TO AVOID CONGESTION IN A NETWORK

(71) Applicant: Raytheon Company, Arlington, VA (US)

(72) Inventors: Paul C. Hershey, Ashburn, VA (US); Mu-Cheng Wang, Acton, MA (US)

(73) Assignee: Raytheon Company, Arlington, VA (US)

( * ) Notice: Subject to any disclaimer, the term of this patent is extended or adjusted under 35 U.S.C. 154(b) by 186 days.

(21) Appl. No.: 18/052,040

(22) Filed: Nov. 2, 2022

(65) Prior Publication Data

US 2024/0146656 A1    May 2, 2024

(51) Int. Cl.
| | |
|---|---|
| *H04L 47/122* | (2022.01) |
| *H04L 47/11* | (2022.01) |
| *H04L 47/32* | (2022.01) |

(52) U.S. Cl.
CPC .......... *H04L 47/122* (2013.01); *H04L 47/11* (2013.01); *H04L 47/32* (2013.01)

(58) Field of Classification Search
CPC ....... H04L 47/122; H04L 47/11; H04L 47/32; H04L 47/12
See application file for complete search history.

(56) References Cited

U.S. PATENT DOCUMENTS

| | | | |
|---|---|---|---|
| 9,537,789 B2 | 1/2017 | Wang et al. | |
| 11,863,449 B2 * | 1/2024 | Lu | H04L 47/6215 |
| 2006/0198508 A1 * | 9/2006 | Delaney | H04M 3/2272 |
| | | | 379/221.12 |
| 2011/0255410 A1 * | 10/2011 | Yamen | H04L 47/728 |
| | | | 370/237 |

OTHER PUBLICATIONS

Akyol et al., "Joint Scheduling and Congestion Control in Mobile Ad-Hoc Networks;" Conference Paper from the 27th Conference on Computer Communications IEEE INFOCOM 2008; May 2008; 10 Pages.
Bui et al., "Novel Architectures and Algorithms for Delay Reduction in Back-Pressure Scheduling and Routing;" Long Version; Conference Paper from the 28th Conference on Computer Communications IEEE INFOCOM 2009; May 28, 2010; 29 Pages.
Bui et al., "Novel Architectures and Algorithms for Delay Reduction in Back-Pressure Scheduling and Routing;" Short Version; Conference Paper from the 28th Conference on Computer Communications IEEE INFOCOM 2009; May 28, 2010; 5 Pages.

(Continued)

*Primary Examiner* — Soe Hlaing
(74) *Attorney, Agent, or Firm* — Schwegman Lundberg & Woessner, P.A.

(57) ABSTRACT

In one aspect, a method includes receiving a packet at a first node from a second node, wherein the first node and the second node are part of a network; determining if congestion exists in a primary route used by the packet; processing a packet drop event to establish a secondary route for the packet in response to determining that the congestion exists in the primary route; and restoring use of the primary route if an expiration time has expired. The expiration time is adjusted by an elapsed period and a congestion condition within the network.

18 Claims, 9 Drawing Sheets

(56) References Cited

OTHER PUBLICATIONS

Bui et al., "Optimal Resource Allocation for Multicast Sessions in Multi-Hop Wireless Networks;" Philosophical Transactions of the Royal Society A; Published Mar. 6, 2008; pp. 2059-2074; 16 Pages.

Cazenave, "Residual Networks for Computer Go;" Article in IEEE Transactions on Computational Intelligence and AI in Games; Mar. 2017; 4 Pages.

Cheng et al., "Network Function Virtualization in Dynamic Networks: A Stochastic Perspective;" IEEE Journal on Selected Areas in Communication, vol. 36, Issue 10; Oct. 2018; pp. 2218-2232; 14 Pages.

Hai et al., "Delay-Optimal Back-Pressure Routing Algorithm for Multihop Wireless Networks;" IEEE Transactions on Vehicular Technology, vol. 67, No. 3; Mar. 2018; 14 Pages.

Joo et al., "Understanding the Capacity Region of the Greedy Maximal Scheduling Algorithm in Multi-hop Wireless Networks;" IEEE/ACM Transactions on Networking, vol. 17, Issue 4; Aug. 2009; pp. 1132-1145; 9 Pages.

Kato et al., "The Deep Learning Vision for Heterogeneous Network Traffic Control: Proposal, Challenges, and Future Perspective;" IEEE Wireless Communications; Jun. 2017; 8 Pages.

Kochenderfer, "Decision Making Under Uncertainty;" Theory and Application; The MIT Press; Dec. 30, 2021; 349 Pages.

Lott et al., "Stochastic Routing in Ad-Hoc Networks;" IEEE Transactions on Automatic Control, vol. 51, No. 1; Jan. 2006; 19 Pages.

Lu et al., "A Novel QoS-Aware ARQ Scheme for Multi-User Transmissions in IEEE802.11ax WLANs;" Article from Electronics; Published Dec. 4, 2020; 22 Pages.

Moeller et al., "Routing Without Routes: The Backpressure Collection Protocol;" Proceedings of the $9^{th}$ ACN/IEEE International Conference on Information Processing in Sensor Networks (ISPN '10); Apr. 2010; pp. 279-290; 12 Pages.

Pei et al., "Resource Aware Routing for Service Function Chains in SDN and NFV-Enabled Network;" IEEE Transactions on Services Computing, vol. 14, No. 4; Jul./Aug. 2021; 13 Pages.

Pei et al., "Two-Phase Virtual Network Function Selection and Chaining Algorithm Based on Deep Learning in SDN/NFV-Enabled Networks;" IEEE Journal on Selected Areas in Communications, vol. 38, No. 6; Jun. 2020; 16 Pages.

Silver et al., "A General Reinforcement Learning Algorithm that Masters Chess, Shogi and Go Through Self-Play;" Report from *Science,* No. 362, Issue 6419; Dec. 7, 2018; 32 Pages.

Silver et al., "Mastering the Game of Go Without Human Knowledge;" Article in *Nature*; Published Oct. 19, 2017; 42 Pages.

Sutton et al., "Reinforcement Learning: An Introduction;" Second Edition, in progress; The MIT Press; Dec. 2014/Jan. 2015; 352 Pages.

Tang et al., "On Removing Routing Protocol From Future Wireless Networks: A Real-Time Deep Learning Approach for Intelligent Traffic Control;" IEEE Wireless Communications; Feb. 2018; 7 Pages.

Wang et al., "Dynamic Bandwidth Allocation for QoS Provisioning in IEEE 802.16 Networks with ARQ-SA;" IEEE Transactions on Wireless Communications, vol. 7, No. 9; Sep. 2008; 11 Pages.

Ying et al., "On Combining Shortest-Path and Back-Pressure Routing Over Multihop Wireless Networks;" IEEE INFOCOM 2009; Apr. 19, 2009; 9 Pages.

Zheng et al., "Optimal Routing in Stochastic Networks with Reliability Guarantees;" 2021 IEEE International Intelligent Transportation Systems Conference (ITSC); Sep. 19, 2021; 6 Pages.

\* cited by examiner

PACKET REROUTING TO AVOID CONGESTION IN A NETWORK

BACKGROUND

A communication network includes multiple routers. The routers are located at subnet boundaries that are located between a sender and a receiver. The routers transfer data packets originating from the sender to the intended receiver. Often a communication network has multiple possible paths between the sender and the receiver, but only one single path is chosen to send data between the sender and the receiver.

SUMMARY

In one aspect, a method includes receiving a packet at a first node from a second node, wherein the first node and the second node are part of a network; determining if congestion exists in a primary route used by the packet; processing a packet drop event to establish a secondary route for the packet in response to determining that the congestion exists in the primary route; dropping the packet in response to determining that the congestion exists; and restoring use of the primary route if an expiration time has expired. The expiration time is adjusted by an elapsed period and a congestion condition within the network. Processing the packet drop event includes saving the packet drop event as a record in a packet drop table of the first node; removing one or more obsolete records in the packet drop table; updating a packet drop rate; determining if the packet drop rate is greater than or equal to a threshold; and sending a notification of a packet drop to the second node in response to the packet drop rate being greater than or equal to the threshold.

In another aspect, an article includes a non-transitory computer-readable medium that stores computer-executable instructions. The instructions cause a machine to receive a packet at a first node from a second node, wherein the first node and the second node are part of a network; determine if congestion exists in a primary route used by the packet; process a packet drop event to establish a secondary route for the packet in response to determining that the congestion exists in the primary route; drop the packet in response to determining that the congestion exists; and restore use of the primary route if an expiration time has expired. The expiration time is adjusted by an elapsed period and a congestion condition within the network. The instructions causing the machine to process the packet drop event includes instructions causing the machine to save the packet drop event as a record in a packet drop table; remove one or more obsolete records in the packet drop table; update a packet drop rate; determine if the packet drop rate is greater than or equal to a threshold; and send a notification of a packet drop to the second node in response to the packet drop rate being greater than or equal to the threshold.

In a further aspect, a network includes electronic circuitry configured to receive a packet at a first node from a second node, wherein the first node and the second node are part of a network; determine if congestion exists in a primary route used by the packet; process a packet drop event to establish a secondary route for the packet in response to determining that the congestion exists in the primary route; drop the packet in response to determining that the congestion exists; and restore use of the primary route if an expiration time has expired. The expiration time is adjusted by an elapsed period and a congestion condition within the network. The circuitry configured to process the packet drop event includes circuitry configured to save the packet drop event as a record in a packet drop table of the first node; remove one or more obsolete records in the packet drop table; update a packet drop rate; determine if the packet drop rate is greater than or equal to a threshold; and send a notification of a packet drop to the second node in response to the packet drop rate being greater than or equal to the threshold.

DETAILED DESCRIPTION

Described herein are techniques to reroute packets when congestion is detected. In one example, the techniques described herein temporarily reroute lower priority packets, which get dropped in the subsequent node due to the congestion, from a primary route to a secondary route when congestion is detected and reestablishes the primary route for lower priority packets when an expiration time (ET) has expired. As will be shown herein, the ET may be adjusted overtime based on network conditions such as, for example, new and/or continuing congestions.

In one example, the techniques described herein use Reinforcement Learning (RL) techniques such as, for example, reward-based learning. As will be described further herein, reward-based RL techniques are used in the maintenance of network traffic to autonomously adjust to an on-set of congestion as a function of an elapsed period (f(EP)); and after initial congestion conditions are resolved through reinforcement learning using the processes described in FIGS. 4 to 5. In particular, the processes herein describe how to adjust traffic flow for low priority traffic from the initial onset of congestion to resolution through temporarily rerouting traffic until an expiration time. There exists a fundamental issue with traditional network design, i.e., the lack of communication between QoS and routing protocols. QoS is applied when the congestion problem is detected. Routing protocols is used to determine where to forward the received packet at a node. However, when the congestion occurs, the low priority packets get dropped by a node. Its predecessor node is not aware of the packet drop issue, and thus, still uses the same route to forward the low priority packets. If an application deploys the reliable communication protocols, once it detects the packet loss, it will resend the dropped packets via the same route and those packets will be dropped again. Under such circumstance, QoS alone does not eliminates the congestion problem. On the contrary, QoS may actually waste more network valuable resources for the dropped packets. A novel backpressure scheme (via the packet drop notification message) described further herein bridges the gap between QoS and routing protocols. Instead of dropping low priority packets when the congestion occurs, those packets will be temporarily rerouted via an alternate route until the congestion problem is resolved.

Figure 1A:
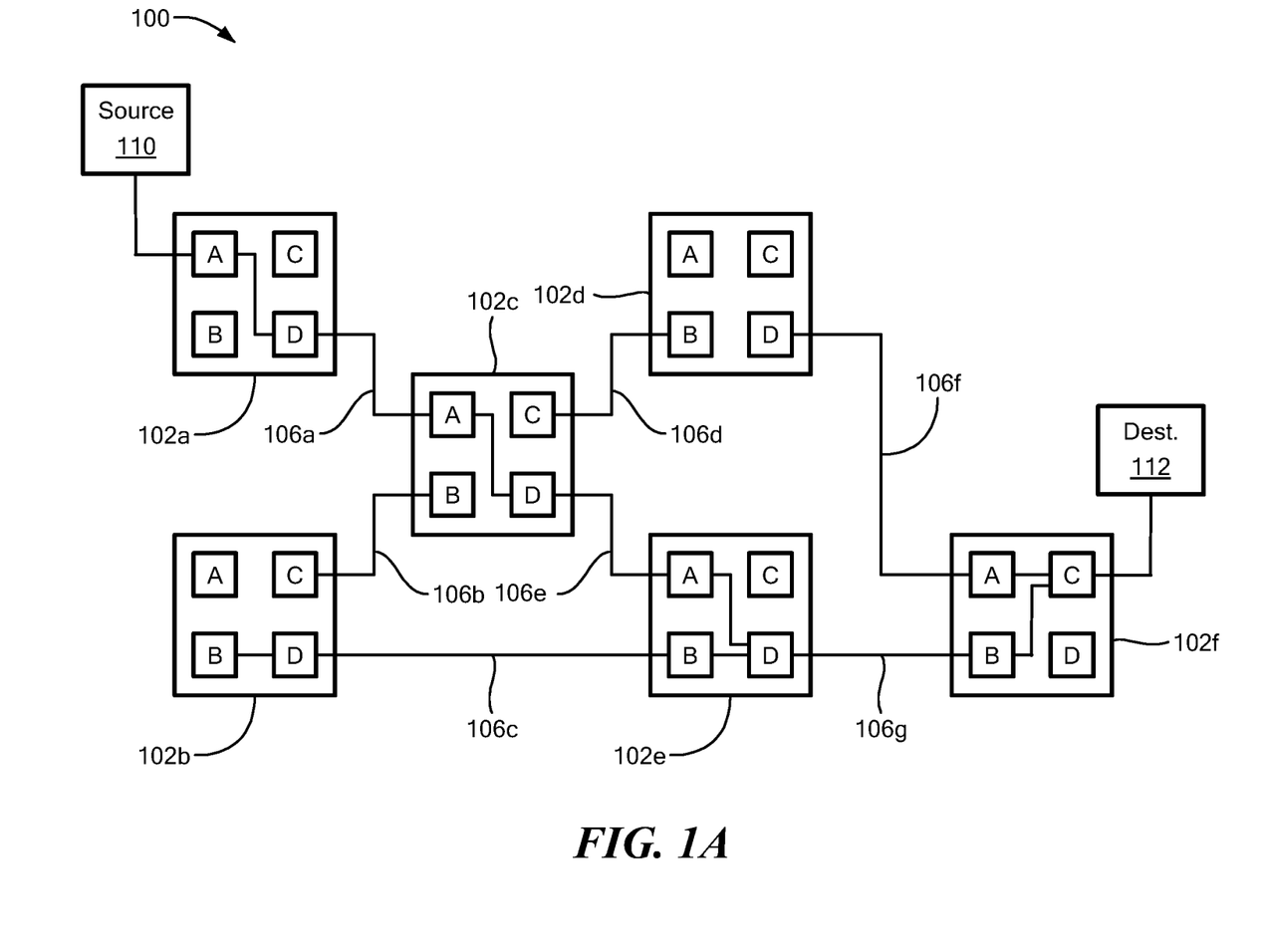
FIG. 1A is a block diagram of an example of a network.
Figure 1B:
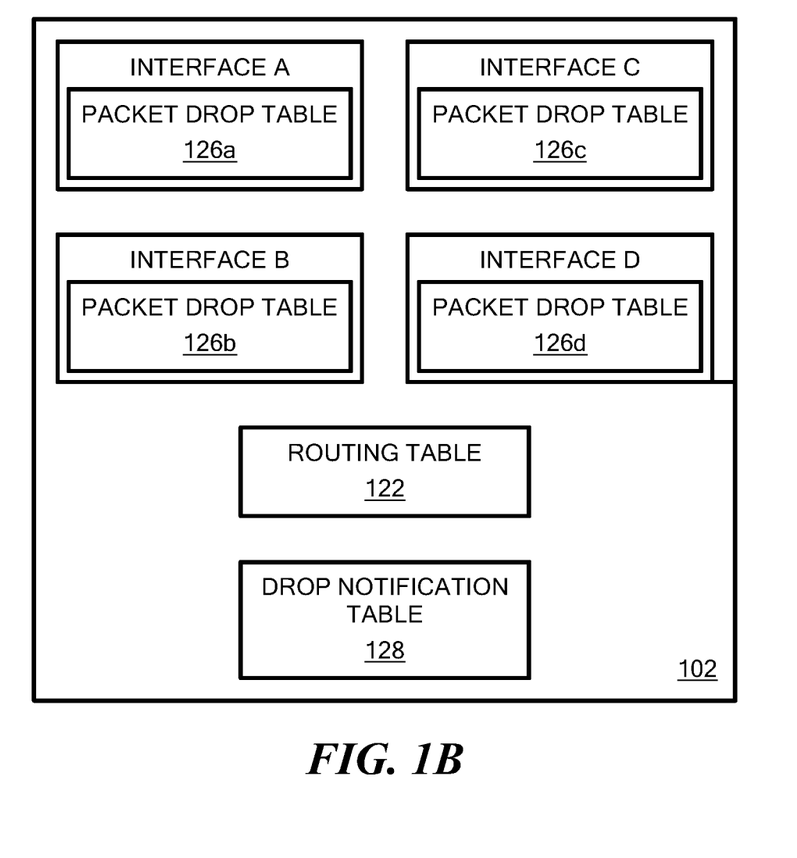
FIG. 1B is a block diagram of an example of a node in the network of FIG. 1A.

Referring to FIGS. 1A and 1B, an example of a network 100 used for communications is a network 100. The network 100 includes nodes (e.g., a node 102a, a node 102b, a node 102c, a node 102d, a node 102e, a node 102f). Each node 102a-102f has multiple I/O interfaces and each interface has an ingress port and an egress port. In one example, the nodes 102a-102f may be routers. In one example, the nodes 102a-102f may be aerial platforms, space platforms and/or land-based platforms.

An example of the nodes 102a-102f is a node 102. The node 102 has I/O interfaces (e.g., interface A, interface B, interface C, interface D). The node 102 includes a routing table 122 used to store a primary path for a packet.

The node 102 also includes a packet drop table at each interface (e.g., Interface A includes a packet drop table 126a, Interface B includes a packet drop table 126b, Interface C includes a packet drop table 126c, Interface D includes a packet drop table 126d), which records the packets that are dropped at the interface. In one example, for each packet that is dropped, a record is formed in the packet drop table of that interface. A record includes a source address (e.g., a source Media Access Control (MAC) address, a source Internet Protocol (IP) address, a destination IP address, a classification (e.g., Differentiated Services Code Point (DSCP), protocol ID, and so forth) and drop time (DT). DT is set to the current time (CT). Then, for records with the same information except DT, the drop statistics is calculated based on the number of packets being dropped during a given period. A sliding window scheme is used to remove records from the packet drop table when they are obsoleted.

The node 102 further includes a drop notification table 128, which records a notification from a subsequent node in the packet route that a packet has been dropped. In one example, for each packet drop notification received, a record is formed in the drop notification table 128 that records a source MAC address, destination MAC and IP addresses, a classification (e.g., DSCP), a receiving time (RT) of the packet drop notification and an expiration time (ET) of the rerouting. As will be described further herein the ET may be adjusted based on network conditions.

A link 106a connects the egress port of interface D of the node 102a to the ingress port of interface A of the node 102c. A link 106b connects the egress port of C of the node 102b to the ingress port of B of the node 102c. A link 106c connects the egress port of D of the node 102b to the ingress port of B of the node 102e. A link 106d connects the egress port of C of the node 102c to the ingress port of B of the node 102d. A link 106e connects the egress port of D of the node 102c to the ingress port of A of the node 102e. A link 106f connects the egress port of D of the node 102d to the ingress port of A of the node 102f. A link 106g connects the egress port of D of the node 102e to the ingress port of B of the node 102f. Each of the links 106a-106g is a bi-directional communication link. In some examples, each of the links 106a-106g may be one of wired links (copper or fiber-optic links), wireless links or a combination of the two (or any other media that can carry IP or other digitally encoded data traffic).

In some examples, the nodes 102a-102f may form a multi-layered hierarchical mobile ad-hoc network (MANET). In some examples, although a network which may have wired links, wireless links and/or combination, can potentially offer multiple routes for each given source and destination pair, each network node 102a-102f may select an "appropriate" communications path which can satisfy the mission requirements, such as jitter, latency, and minimum bandwidth.

The network 100 may include a source 110 and a destination 112. In this example, the source 110 is connected to the ingress port of A of the node 102a and the destination 112 is connected to the egress port of C of the node 102f.

As can be observed in FIG. 1A, there are a number of paths between the source 110 and the destination 112 that data packets can travel. In one particular example, packets sent from the source 110 are sent on a primary path to the destination 112. The primary route is determined by the deployed routing protocol based on the evaluation of specified cost functions.

In one example, for ease of description, the primary path used herein starts from the source 110 and goes to the ingress port A to the egress port of D of the node 102a, continues to the ingress port of A to the egress port of D of the node 102c, continues to the ingress port of A to the egress port of D of the node 102e, continues to the ingress port of B to the egress port of C of the node 102f, and ends at the destination 112. The remaining disclosure describes rerouting of the dropped packet to a secondary route when congestion occurs at the egress port of D of the node 102e on the primary route and after an ET has expired reverting back to the primary route.

Figure 2:
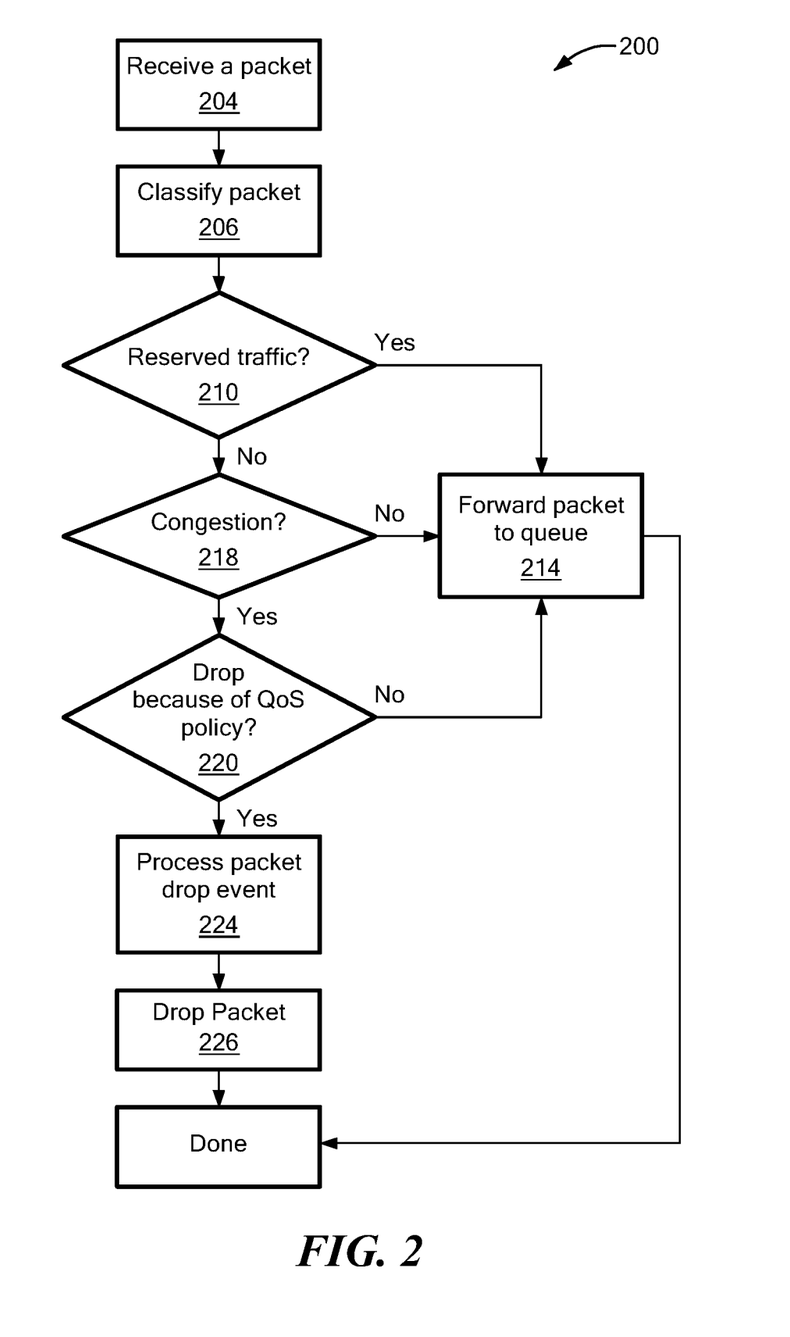
FIG. 2 is a flowchart of an example of a process to handle packet processing at a node.

Referring to FIG. 2, an example of a process to handle packet forwarding at an egress port of a node's interface is a process 200. Process 200 receives a packet at an egress port (204). For example, a packet from the source 110 is received at the ingress port of A of the node 102a and is forwarded to the egress port of D according to the routing table 122 (FIGS. 1A and 1B).

Process 200 classifies the received packet (206). For example, a node 102a (FIG. 1A) classifies a packet based on a DSCP value.

Process 200 determines if the packet is part of reserved traffic (210). Network operators and/or mission planners can optionally reserve the network resources to meet the individual mission requirements. Once the reservation is made, a node 102a will direct the traffic to follow a reserved route. For the reserved traffic, it will not be dropped when the congestion occurs. Thus, process 200 forwards the packet to the destined queue (214). For example, the node 102a determines that the packet is part of a reserved traffic (e.g., a mission critical traffic), and the node 102a sends the packet to a queue to be transmitted to the node 102c (FIG. 1A). The reservation scheme is described in U.S. Pat. No. 9,537,789 issued on Jan. 3, 2017, entitled "RESOURCE ALLOCATING IN A NETWORK", which has the same assignee as the present application and is incorporated herein in its entirety.

If the packet is not part of a reserved traffic or the resource reservation is not deployed, process 200 determines if there is any congestion (218) in the destined egress port. For example, assuming the interface D is selected, a node 102c determines if there is any congestion in the egress port of D of the node 102c (FIG. 1A).

If there is no congestion in the egress port, process 200 forwards the packet to the destined queue (214). For example, the node 102c determines that the egress port of D of the node 102c has no congestion. Process 200 forwards the packet to the destined queue before the packet is transmitted to the node 102e (214).

If there is congestion in the selected egress port, process 200 determines whether the packet should be dropped according to the pre-defined QoS policy (220). If the packet is allowed to transmit, process 200 will forward the packet to the destined queue (214). Otherwise, process 200 performs a packet drop event process (224) and drops the packet (226). For example, the node 102e determines that there is congestion at the egress port of D of the node 102e, performs the packet drop event process and drops the packet (FIG. 1A).

Figure 3:
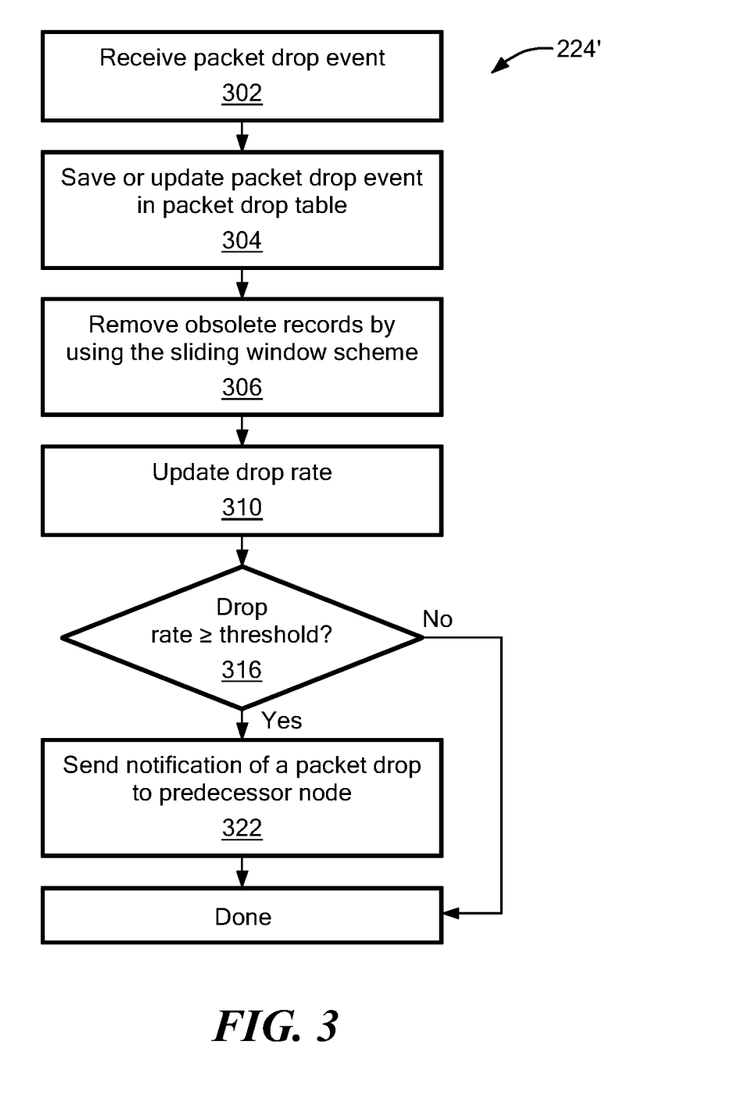
FIG. 3 is a flowchart of an example of a process to handle a packet drop event at a node.

Referring to FIG. 3, an example of performing the processing block 224 (FIG. 2) is a process 224'. In one example, the process 224' is performed by the node 102e in response to congestion at the egress port of D of the node 102e (FIG. 1A). Process 300 receives the packet drop event (302) and saves the packet drop event in the packet drop table (304). For example, the node 102e saves the packet drop event as a new record in the packet drop table 126 (FIG. 1A). A record includes the following information: the source MAC address, the source IP address, the destination IP address, the classification information (e.g., DSCP) and the current time.

Process 300 removes obsolete records in the packet drop table (306). For example, using a sliding window scheme (e.g., a time-based sliding window), the node 102e removes obsolete records from the packet drop table (FIG. 1A). As used herein, a sliding window scheme is used to calculate an average packet drop rate over an interval of time instead of the lifetime of the connection. As time advances, the records which DT falls outside the interval will be removed from the table.

Process 300 updates packet drop rate (310) after removing the obsolete records and adding the new record. For example, the node 102e updates the packet drop rate (FIG. 1A).

Process 300 determines if the updated drop rate is greater than or equal to a threshold (316). For example, the node 102e determines if the updated drop rate is greater than or equal to the threshold (FIG. 1A). The congestion can occur at an egress port due to momentary traffic imbalance between the arrival rate and departure rate at that port. Usually, this problem can be resolved quickly by itself. Thus, no action is needed. However, if the problem is caused by abnormally high traffic volume and/or link degradation, it may last longer and cause more damage. Thus, a threshold is used to filter out momentary congestion cases.

If the drop rate is greater than or equal to the threshold, process 300 sends a notification of packet drop to a predecessor node (322). For example, the node 102e sends a notification of a packet drop to the predecessor node as described in the Source MAC address of packet drop event, which is saved in the interface D of node 102c (FIG. 1A).

Figure 4:
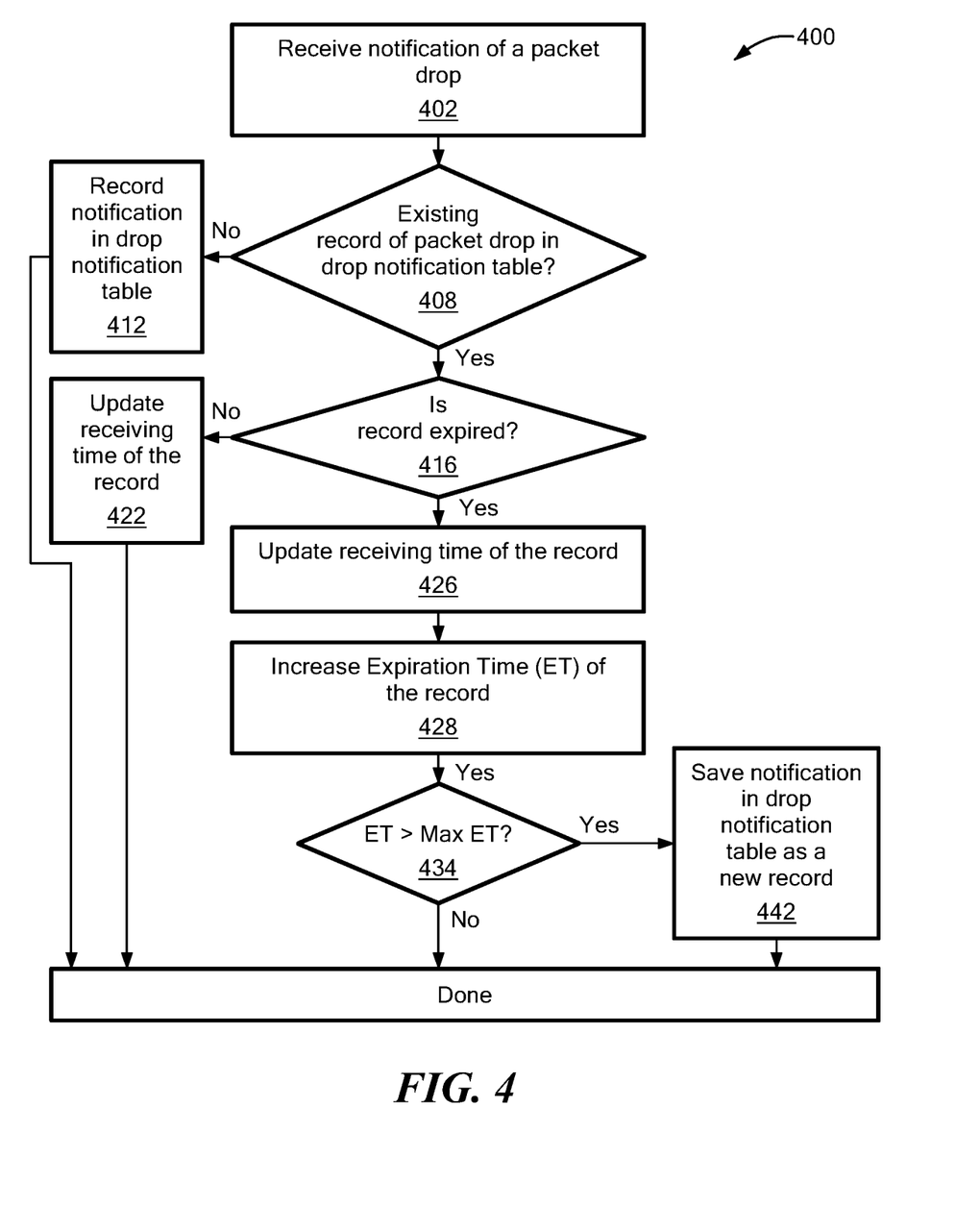
FIG. 4 is a flowchart of an example of a process to handle a packet drop notification at a predecessor node.

Referring to FIG. 4, an example of a process to handle a packet drop notification at a predecessor node is a process 400. For example, the process 400, in the ongoing example described herein, would be performed by the node 102c as the predecessor node of the node 102e, which has congestion at the egress port of D of the node 102e. In one particular example, the process 400 is performed at the interface D of the node 102c (FIG. 1A).

Process 400 receives a notification of a packet drop (402). For example, the node 102c would receive a notification of a packet drop from the node 102e (FIG. 1A).

Process 400 determines if an existing record of the packet drop is in the drop notification table (408). For example, the node 102c would determine if an existing record exists in its drop notification table 128 (FIGS. 1A and 1B).

If the existing record does not already exist in the drop notification table, process 400 records notification in the drop notification table (412). For example, the node 102c records the notification of the drop as a record in its drop notification table 128 (FIGS. 1A and 1B). In one example, the ET is set at a default value.

If the existing record does already exist in the drop notification table, process 400 determines if the record has expired (416). For example, the node 102c determines the record has expired if the CT less the RT is greater than or equal to the ET (FIG. 1A).

If the record has not expired, process 400 updates the RT of the record (422). For example, the node 102c updates the RT by making RT=CT in its drop notification table 128 (FIGS. 1A and 1B).

If the record has expired, process 400 updates the RT of the record (426) and increases ET of the record (428). For example, the node 102c updates the RT by making RT=CT in its drop notification table 128 and increases the ET of the record in its drop notification table 128 (FIGS. 1A and 1B). In one example, the new ET is n times the default value where n is greater than 1.

Process 400 determines if the ET is greater than the maximum ET (434). For example, the node 103c determines if the ET is greater than the maximum ET (FIG. 1A). There is an assumption that when an elapsed period between two drop notification events is larger than the maximum ET, the causes of two packet drops are most likely unrelated.

If the ET is greater than the maximum ET, process 400 saves the notification in drop notification table as a new record with ET set at a default value (442). For example, the node 103c saves the notification of a packet drop in its drop notification table 128 as a new record with ET set at the default value (FIGS. 1A and 1B).

Figure 5:
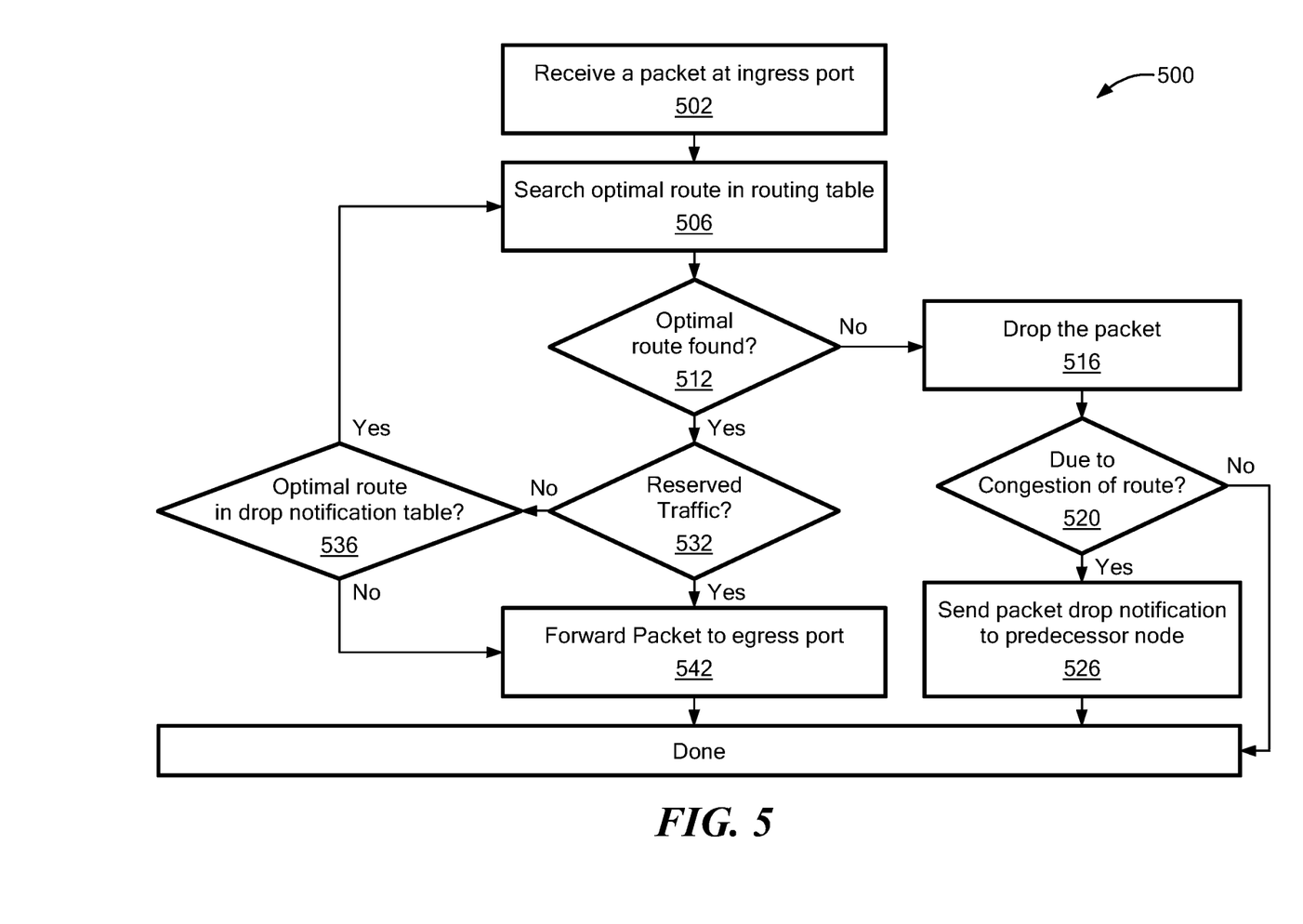
FIG. 5 is a flowchart of an example of a process to handle a packet at the predecessor node.

Referring to FIG. 5, an example of a process to handle a packet received from a peer node is a process 500. For example, the process 500, in the ongoing example described herein, would be performed by the node 102c as the predecessor node of the node 102e, which has congestion at the egress port D of the node 102e (FIG. 1A). In one particular example, the process 500 is performed at the ingress port of A of the node 102c (FIG. 1A).

Process 500 receives a packet at an ingress port of the predecessor node (502). For example, the node 102a sends the packet to the ingress port of A of the node 102c (FIG. 1A).

Process 500 searches for an optimal route for this packet in routing table (506). For example, the node 102c searches its routing table 122 for an optimal route (FIGS. 1A and 1B).

Process 500 determines if the optimal route is found (512). For example, node 102c determines if the optimal route is found (FIG. 1A).

If the optimal route is found, the process 500 determines if the packet is part of a reserved traffic (532). For example, the node 102c determine if the packet is part of a reserved traffic (FIG. 1A).

If the packet is part of a reserved traffic, the packet is forwarded to an egress port in the reserved route (542). For example, the packet would be forwarded to the egress port of D of the node 102c to be sent to the node 102e to follow the primary route (FIG. 1A).

If the packet is not part of any reserved traffic, process 500 determines if the optimal route is in the drop notification table (536). For example, the node 102c searches its drop notification table 128 to determine if the optimal route is in the drop notification table 128 of the node 102c (FIGS. 1A and 1B).

If the optimal route is not in the drop notification table, the packet is forwarded to an egress port (542). For example, the node 102c forwards the packet to the egress port of D of the node 102c to be sent to the node 102e to follow a secondary route (FIG. 1A).

If the optimal route is in the drop notification table, process 500 searches for an alternate route in the routing table (506). For example, the alternate route follows the link 106d to the node 102d and follows the link 106f to the node 102f to the destination 112 as shown in FIG. 1A.

If the alternate route is not found, the process 500 drops the packet (516). Process 500 determines if the destination becomes unreachable due to congestion of the optimal route (520). If the destination becomes unreachable due to congestion, process 500 sends a packet drop notification to its predecessor node (526). For example, if the node 102d, which forms the alternate route, does not exist, the notification of the packet drop would be sent to the node 102a (FIG. 1A).

As described earlier, when ET is expired, the primary route will be restored. If the ET is too short, the network 100 may flip-flop unnecessarily between a primary route and an alternate route for the dropped packets. If the ET is too long, dropped packets are essentially penalized by not taking advantage of the primary when the congestion is resolved. Thus, dynamically and continuously adjusting the ET based on the current network conditions such as new and/or continuing congestions, has been observed to provide a better network performance than a constant ET.

Figure 6:
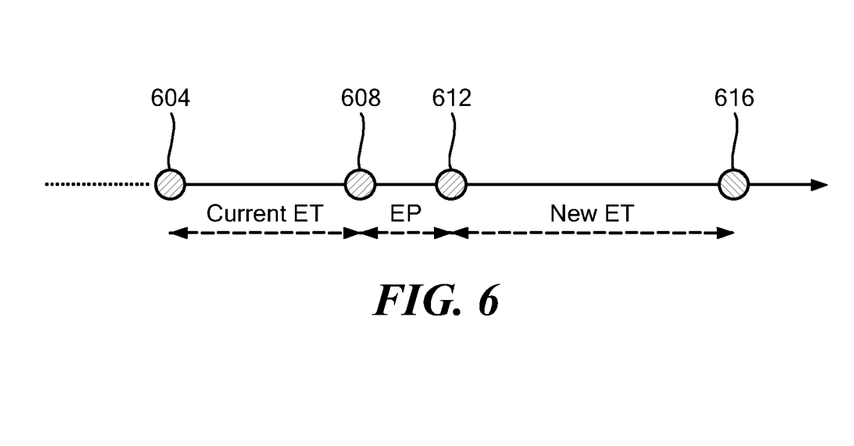
FIG. 6 is a diagram on the relationship between a current expiration time and a new expiration time.
Figure 7:
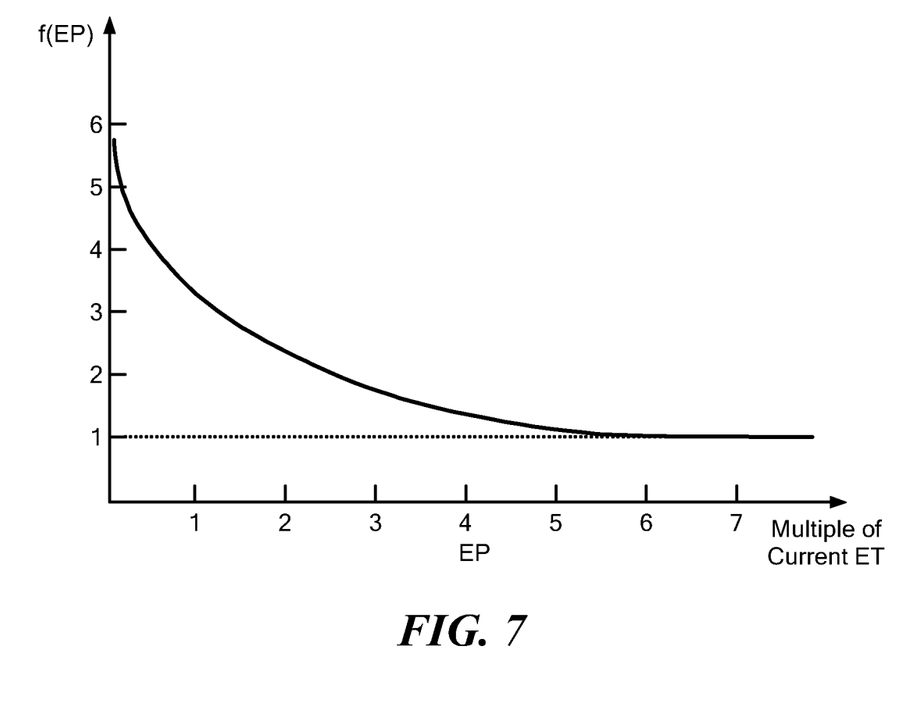
FIG. 7 is a graph of an example of an elapsed period (f(EP))
Figure 8:
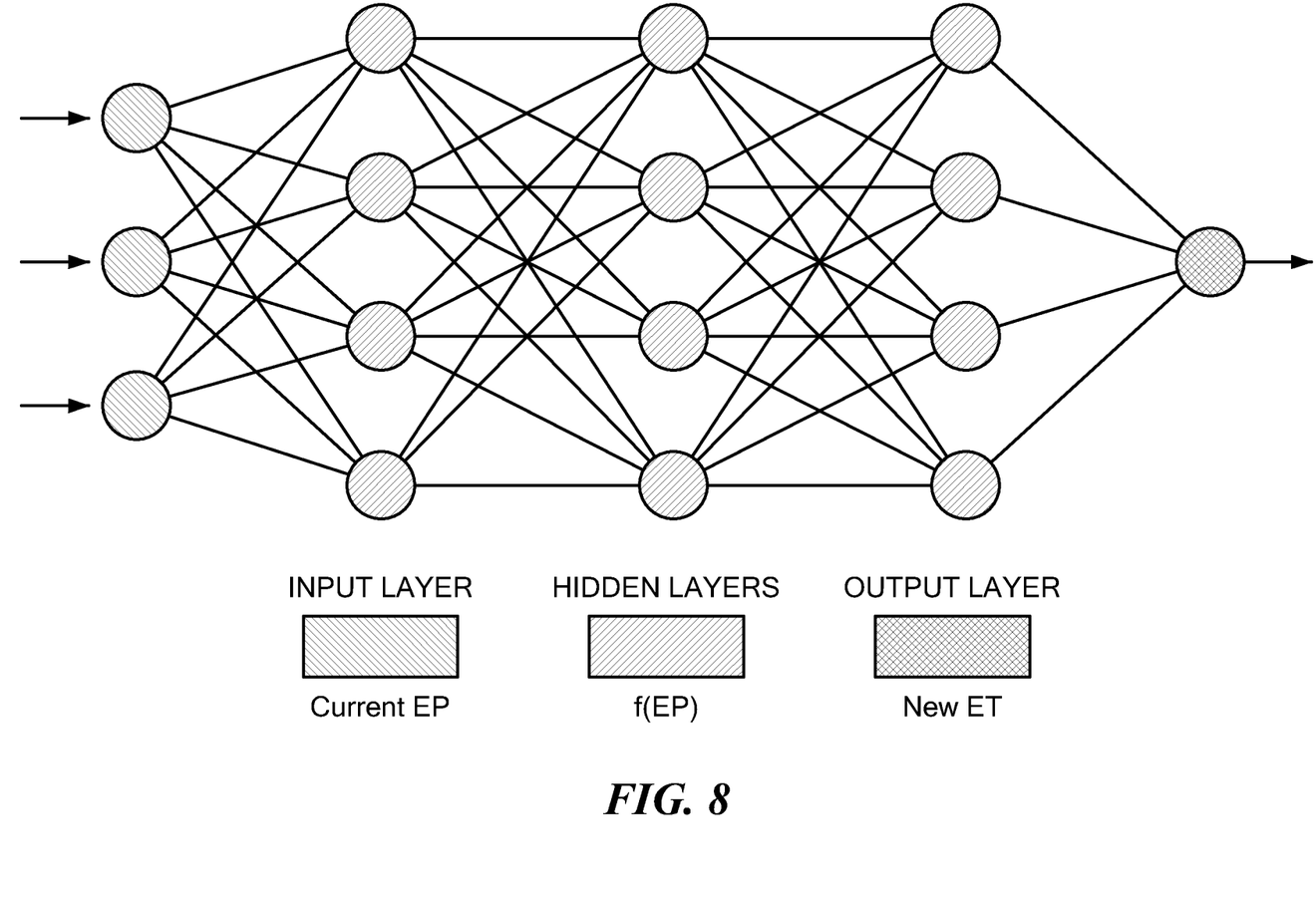
FIG. 8 is a diagram depicting the f(EP) as a neural network to determine a new expiration time.

FIGS. 6 to 8 depict reward-based machine learning techniques that are used in maintenance of network traffic to autonomously adjust to an on-set of congestion as a function of an elapsed period (f(EP)), and after initial congestion conditions are resolved through reinforcement learning using the processes 200, 224', 400 and/or 500.

Referring to FIG. 6, in one example, a time 604 denotes when a prior congestion notification was received (RT); a time 608 denotes when the primary route was restored due to the expiration of ET; a time 612 denotes when a new congestion was received (Current Time (CT)), and the current ET is the time difference between the time 608 and the time 604. The elapsed period EP=(CT−(RT+ET)). ET may be adjusted according to EP. In one particular example, the new ET is the time difference between the time 612 and the time 616.

To dynamically and continuously adjust the ET based on the current network conditions, define new ET=f(EP)×current ET, i.e., ET is dynamically adjusted with respect to EP. Let $\alpha$ be the minimum ET (i.e., default ET) and $\beta$ be the maximum ET. There is an expectation that after the maximum ET, the congestion problem should have been resolved. Thus, when a drop even occurs, it is caused by a new congestion and is unlikely correlated to the prior congestion. There is an assumption that the ET should be between $\alpha$ and $\beta$. If a new ET$\geq\beta$, then the new ET=$\alpha$.

The longer the EP, the less likely the latest drop event is correlated to the prior congestion problem. A notional example of f(EP) is depicted in FIG. 7. The actual f(EP) can be constructed via Neural Networks (an example of a machine learning technique) with the good training data, for example, as shown in FIG. 8. To reduce the search space and time, a known good adjustment function, as depicted in FIG. 7, is leveraged, e.g., $f(EP)=bA^{EP}+c$, where $0<A<1$ and b and c are constant.

Figure 9:
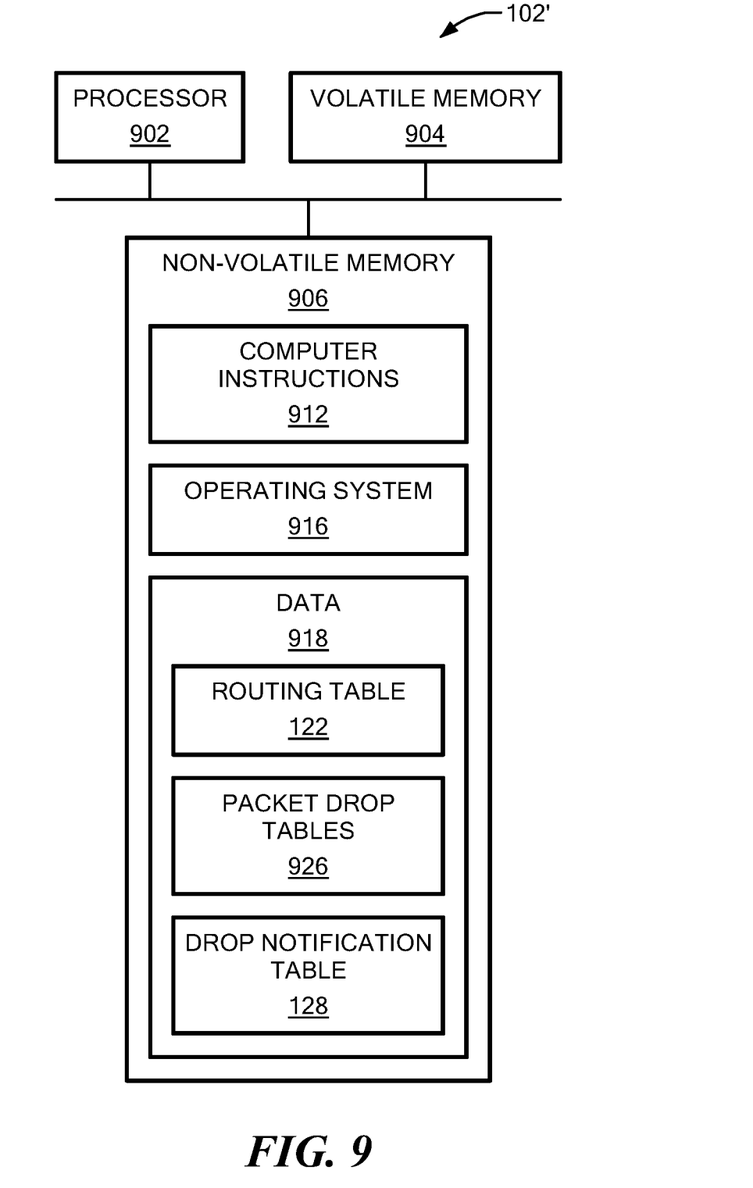
FIG. 9 is a block diagram of an example of a node on which any or part of the processes of FIGS. 2 to 5 may be implemented.

Referring to FIG. 9, an example of a node 102 (FIG. 1B) is a node 102'. The node 102' includes a processor 902, a volatile memory 904, and a non-volatile memory 906 (e.g., hard disk). The non-volatile memory 906 stores computer instructions 912, an operating system 916 and data 918. The data 918 includes a routing table 122 (FIG. 1B), packet drop tables 926 (e.g., the packet drop table 126a, the packet drop table 126b, the packet drop table 126c, the packet drop table 126d (FIG. 1B)) and a drop notification table 128 (FIG. 1B). In one example, the computer instructions 912 are executed by the processor 902 out of volatile memory 904 to perform all or part of the processes described herein (e.g., processes 200, 224', 400 and 500).

The processes described herein (e.g., the processes 200, 224', 400 and 500) are not limited to use with the hardware and software of FIG. 9; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 224', 400 and 500 are not limited to the specific processing order of FIGS. 2 to 5, respectively. Rather, any of the processing blocks of FIGS. 2 to 5 may be re-ordered, combined or removed, performed in parallel or in serial, as necessary, to achieve the results set forth above.

In some examples, multiple routing tables may be combined into a single routing table. In these examples, value-to-route associations are incorporated (directly or indirectly) into the combined routing table thereby enabling the appropriate route selection to be made.

The processing blocks (for example, in the processes 200, 224', 400 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Having described preferred embodiments, which serve to illustrate various concepts, structures, and techniques, which are the subject of this patent, it will now become apparent to those of ordinary skill in the art that other embodiments incorporating these concepts, structures and techniques may be used.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   receiving a packet at a first node from a second node, wherein the first node and the second node are part of a network;
   determining if congestion exists in a primary route used by the packet;
   processing a packet drop event to establish a secondary route for the packet in response to determining that the congestion exists in the primary route, wherein processing the packet drop event comprises:
   saving the packet drop event as a record in a packet drop table of the first node;
   removing one or more obsolete records in the packet drop table;
   updating a packet drop rate;
   determining if the packet drop rate is greater than or equal to a threshold; and
   sending a notification of a packet drop to the second node in response to the packet drop rate being greater than or equal to the threshold, the sending of the notification of a packet drop comprising a drop notification event; and
   restoring use of the primary route if an expiration time has expired,
   wherein the expiration time is adjusted by an elapsed period between two drop notification events and a congestion condition within the network, the elapsed period being an indication of whether causes of the packet drops associated with the two drop notification events are related.

2. The method of claim 1, further comprising using at least one reward-based machine learning technique in maintenance of network traffic to autonomously adjust to congestion as a function of the elapsed period, and after initial congestion conditions are resolved through reinforcement learning.

3. The method of claim 1, wherein packets sent to the secondary route have a lower priority than packets using the primary route during the congestion.

4. The method of claim 1, further comprising, at the second node:
   receiving the notification of the packet drop from the first node;
   determining if a record of the notification exists in a drop notification table of the second node;
   recording the notification as a new record in the drop notification table of the second node if the record does not exist in the drop notification table;
   determining if the record in the drop notification table of the second node expired, wherein the record in the drop notification table of the second node comprises an expiration time and a receiving time;
   updating the receiving time of the record in the drop notification table of the second node;
   increasing the expiration time in response to the record in the drop notification table of the second node being expired;
   determining if the expiration time is greater than a maximum expiration time; and
   saving the notification in the drop notification table of the second node as a new record with the expiration time set at a default value in response to the expiration time being greater than the maximum expiration time.

5. The method of claim 4, further comprising, at the second node:
   receiving the packet at an ingress port of the second node;
   searching for an optimal route in a routing table of the second node; and
   forwarding the packet if the optimal route is not in the drop notification table of the second node.

6. The method of claim 5, further comprising, at the second node, sending a notification of packet drop to a third node if the optimal route is found in the drop notification table of the second node.

7. An article comprising:
   a non-transitory computer-readable medium that stores computer-executable instructions, the instructions causing a machine to:
   receive a packet at a first node from a second node, wherein the first node and the second node are part of a network;
   determine if congestion exists in a primary route used by the packet;
   process a packet drop event to establish a secondary route for the packet in response to determining that the congestion exists in the primary route, wherein the instructions causing the machine to process the packet drop event comprise instructions causing the machine to:
   save the packet drop event as a record in a packet drop table;
   remove one or more obsolete records in the packet drop table;
   update a packet drop rate;
   determine if the packet drop rate is greater than or equal to a threshold; and
   send a notification of a packet drop to the second node in response to the packet drop rate being greater than or equal to the threshold; and restore use of the primary route if an expiration time has expired, wherein the expiration time is adjusted by an elapsed period and a congestion condition within the network, wherein the instructions further cause the machine to use at least one reward-based machine learning technique in maintenance of network traffic to autonomously adjust to congestion as a function of the elapsed period, and after initial congestion conditions are resolved through reinforcement learning.

8. The article of claim 7, wherein packets sent to the secondary route have a lower priority than packets using the primary route during the congestion.

9. The article of claim 7, further comprising instructions causing the machine to, at the second node:
receive the notification of the packet drop from the first node;
determine if a record of the notification exists in a drop notification table of the second node;
record the notification as a new record in the drop notification table of the second node if the record does not exist in the drop notification table;
determine if the record in the drop notification table expired, wherein the record in the drop notification table of the second node comprises an expiration time and a receiving time;
update the receiving time of the record in the drop notification table of the second node;
increase the expiration time in response to the record in the drop notification table of the second node being expired;
determine if the expiration time is greater than a maximum expiration time; and
save the notification in the drop notification table of the second node as a new record with the expiration time set at a default value in response to the expiration time being greater than the maximum expiration time.

10. The article of claim 9, further comprising instructions causing the machine to:
receive the packet at an ingress port of the second node;
search for an optimal route in a routing table of the second node; and
forward the packet if the optimal route is not in the drop notification table of the second node.

11. The article of claim 10, further comprising instructions causing the machine to send a notification of packet drop to a third node if the optimal route is found in the drop notification table of the second node.

12. A network, comprising:
electronic circuitry configured to:
receive a packet at a first node from a second node, wherein the first node and the second node are part of a network;
determine if congestion exists in a primary route used by the packet;
process a packet drop event to establish a secondary route for the packet in response to determining that the congestion exists in the primary route, wherein the circuitry configured to process the packet drop event comprises circuitry configured to:
save the packet drop event as a record in a packet drop table of the first node;
remove one or more obsolete records in the packet drop table;
update a packet drop rate;
determine if the packet drop rate is greater than or equal to a threshold; and
send a notification of a packet drop to the second node in response to the packet drop rate being greater than or equal to the threshold, the sending of the notification of a packet drop being a drop notification event; and
restore use of the primary route if an expiration time has expired, wherein the expiration time is adjusted by an elapsed period between two drop notification events and a congestion condition within the network, the elapsed period being an indication of whether causes of the packet drops associated with the two drop notification events are related.

13. The network of claim 12, further comprising circuitry to use at least one reward-based machine learning technique in maintenance of network traffic to autonomously adjust to congestion as a function of the elapsed period, and after initial congestion conditions are resolved through reinforcement learning.

14. The network of claim 12, wherein the circuitry comprises at least one of a processor, a memory, a programmable logic device or a logic gate.

15. The network of claim 12, wherein packets sent to the secondary route have a lower priority than packets using the primary route during the congestion.

16. The network of claim 12, further comprising circuitry configured to, at the second node:
receive the notification of the packet drop from the first node;
determine if a record of the notification exists in a drop notification table of the second node;
record the notification as a new record in the drop notification table of the second node if the record does not exist in the drop notification table;
determine if the record in the drop notification table of the second node expired, wherein the record in the drop notification table of the second node comprises an expiration time and a receiving time;
update the receiving time of the record in the drop notification table of the second node;
increase the expiration time in response to the record in the drop notification table of the second node being expired;
determine if the expiration time is greater than a maximum expiration time; and
save the notification in the drop notification table of the second node as a new record with the expiration time set at a default value in response to the expiration time being greater than the maximum expiration time.

17. The network of claim 16, further comprising circuitry configured to:
receive the packet at an ingress port of the second node;
search for an optimal route in a routing table of the second node; and
forward the packet if the optimal route is not in the drop notification table of the second node.

18. The network of claim 17, further comprising circuitry configured to send a notification of packet drop to a third node if the optimal route is found in the drop notification table of the second node.

* * * * *

UNITED STATES PATENT AND TRADEMARK OFFICE
CERTIFICATE OF CORRECTION

PATENT NO. : 12,323,330 B2  
APPLICATION NO. : 18/052040  
DATED : June 3, 2025  
INVENTOR(S) : Hershey et al.

Page 1 of 1

It is certified that error appears in the above-identified patent and that said Letters Patent is hereby corrected as shown below:

In the Specification

In Column 6, Line 27, delete "103$c$" and insert --102$c$-- therefor

In Column 6, Line 35, delete "103$c$" and insert --102$c$-- therefor

Signed and Sealed this  
Fifth Day of August, 2025

Coke Morgan Stewart  
*Acting Director of the United States Patent and Trademark Office*